J. W. OWEN AND A. HEWITT.
METHOD OF MAKING RECORD TABLETS.
APPLICATION FILED DEC. 17, 1914. RENEWED APR. 21, 1919.
1,368,745.
Patented Feb. 15, 1921.
6 SHEETS—SHEET 1.
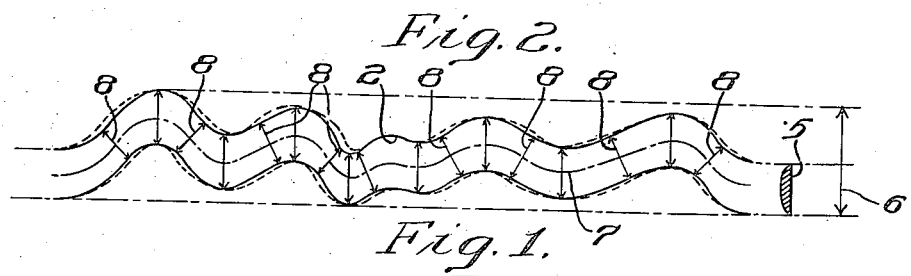
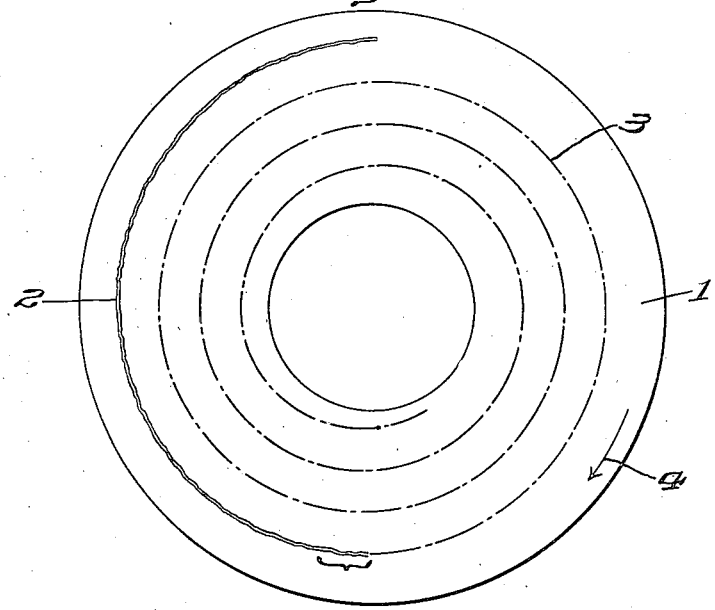
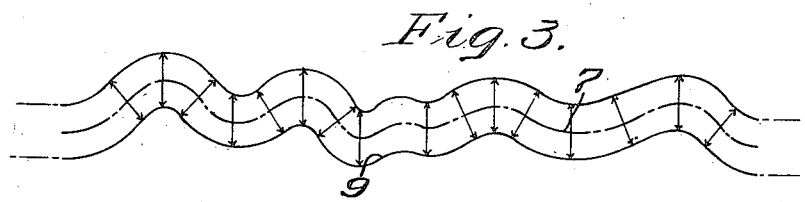
INVENTORS
James W. Owen,
Albertis Hewitt.
WITNESSES
BY
ATTORNEYS

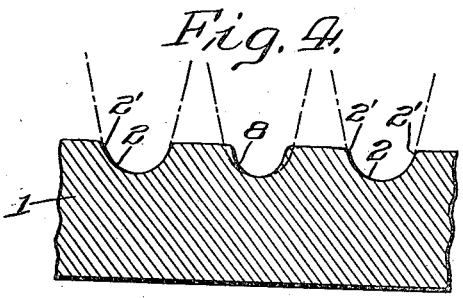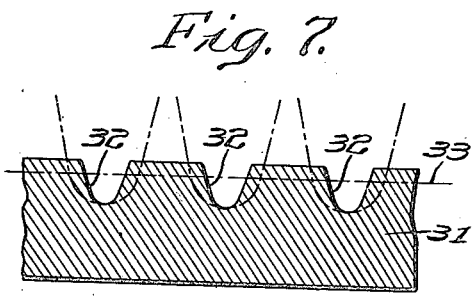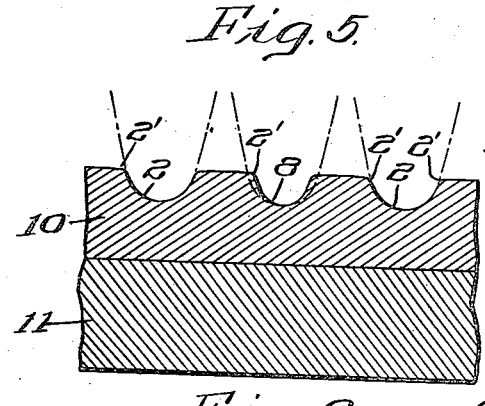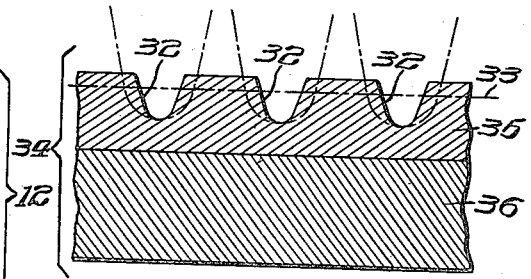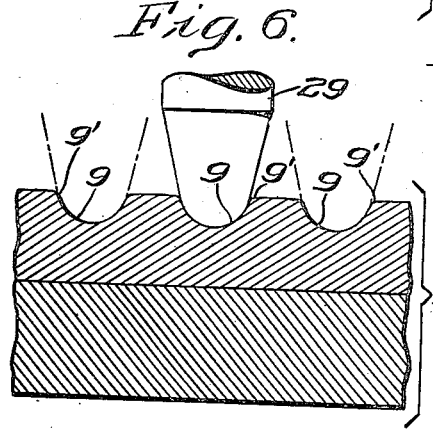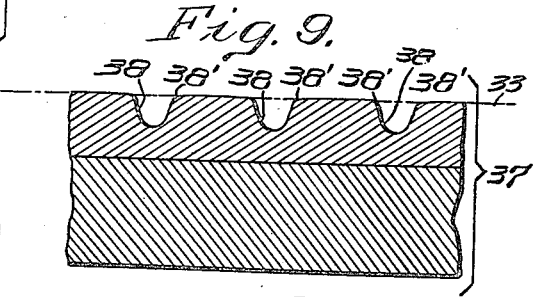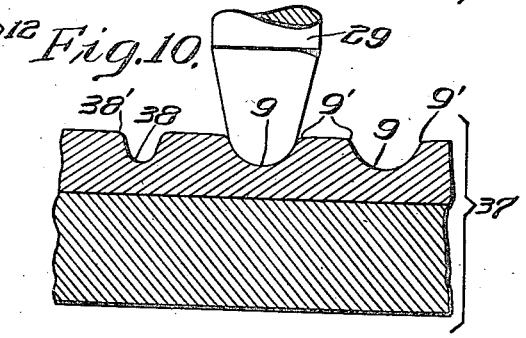

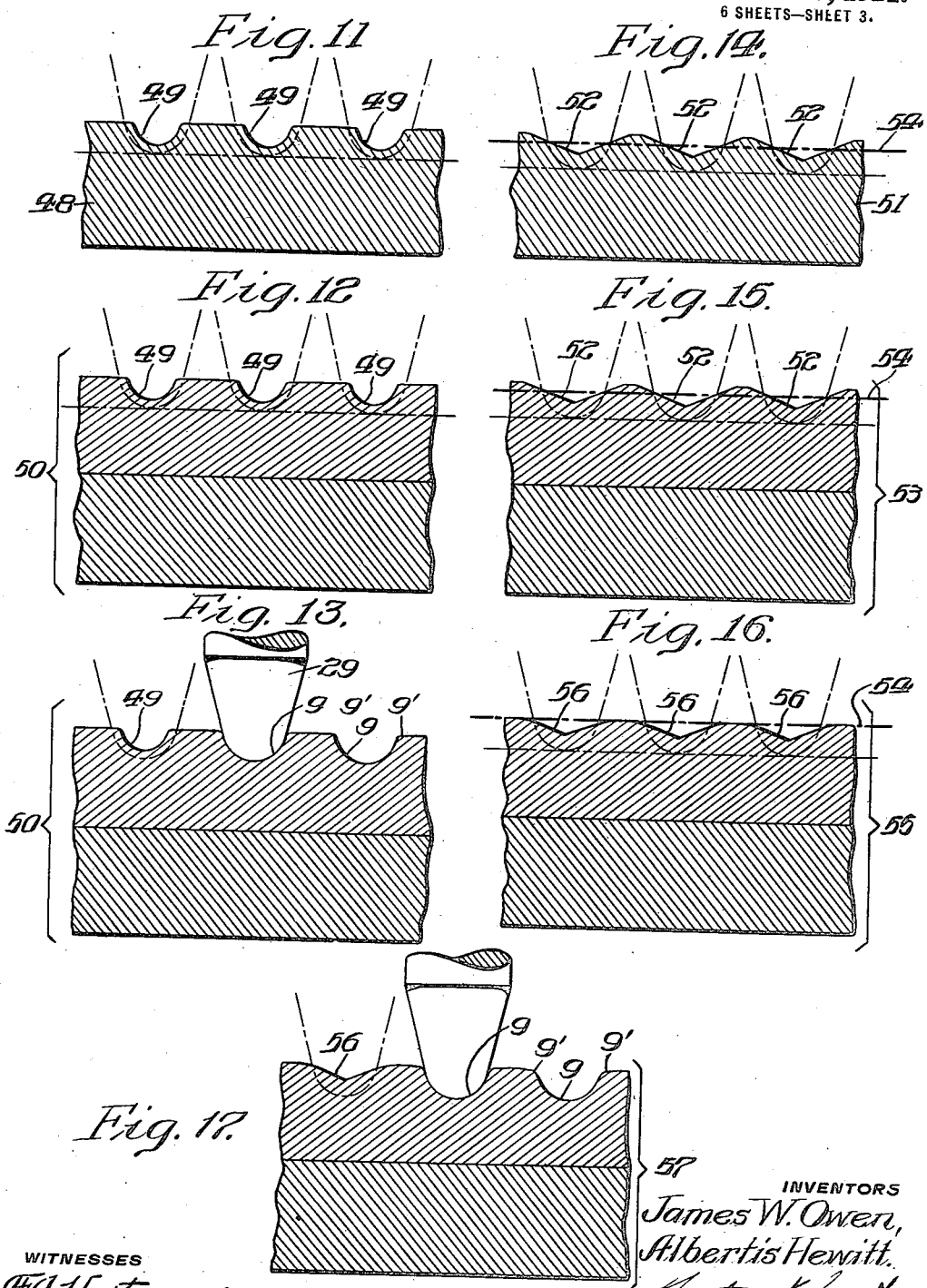

J. W. OWEN AND A. HEWITT.
METHOD OF MAKING RECORD TABLETS.
APPLICATION FILED DEC. 17, 1914. RENEWED APR. 21, 1919.
1,368,745.
Patented Feb. 15, 1921.
6 SHEETS—SHEET 4.
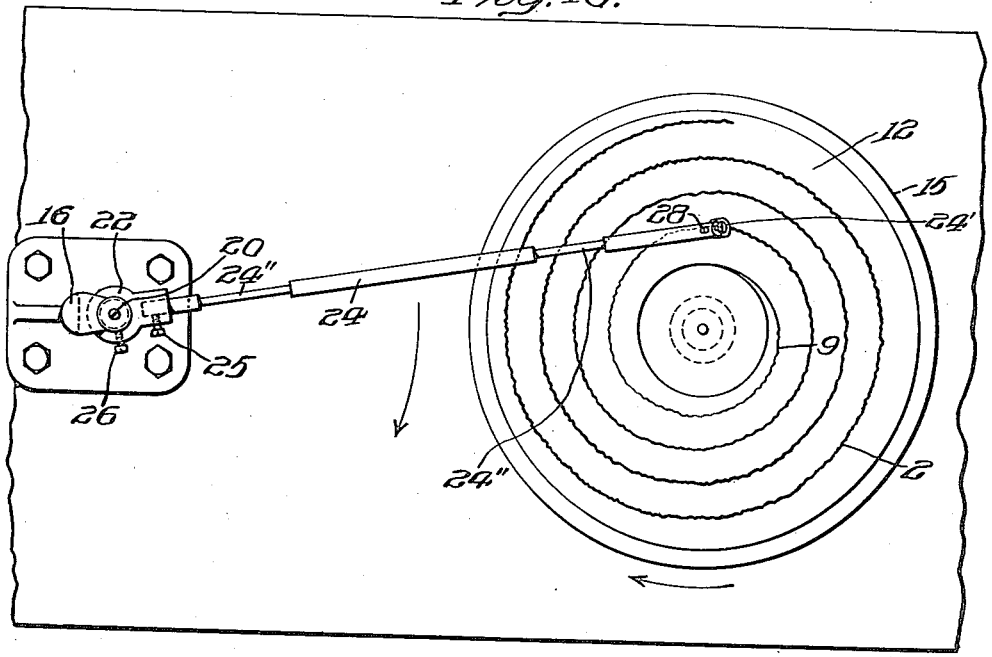
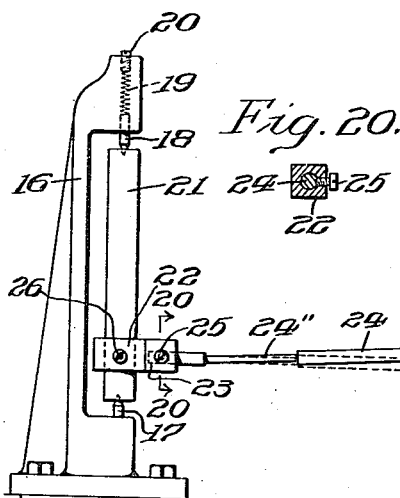
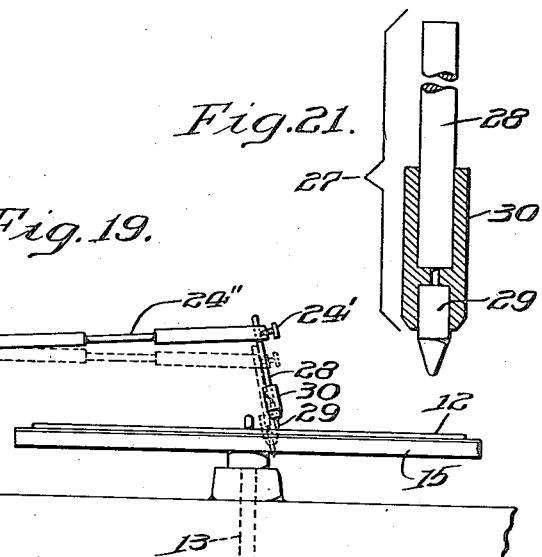
INVENTORS
James W. Owen,
Albertis Hewitt,
WITNESSES
BY
ATTORNEYS J. W. OWEN AND A. HEWITT.
METHOD OF MAKING RECORD TABLETS.
APPLICATION FILED DEC. 17, 1914. RENEWED APR. 21, 1919.
1,368,745.
Patented Feb. 15, 1921.
6 SHEETS—SHEET 5.
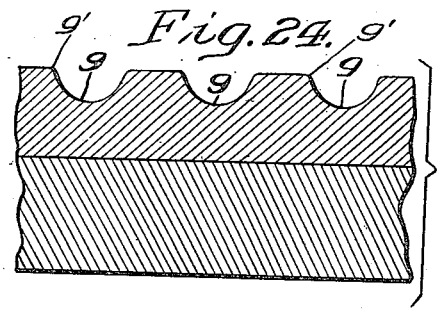
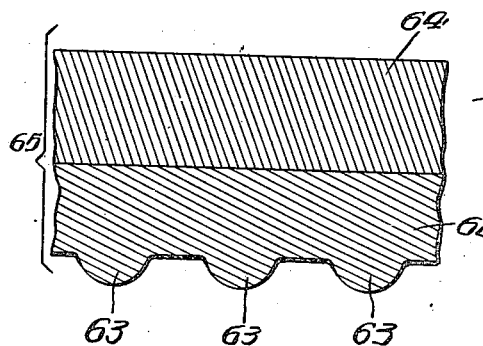
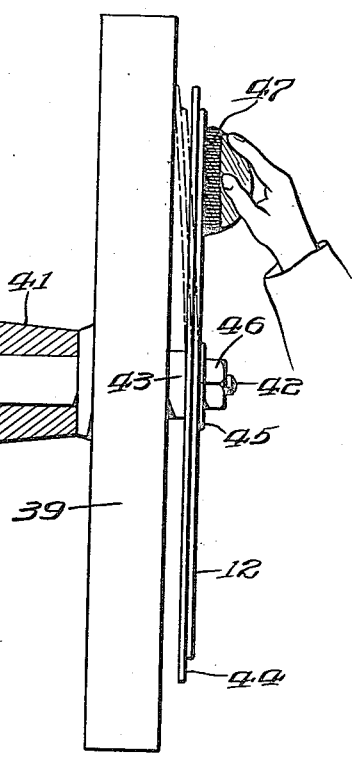
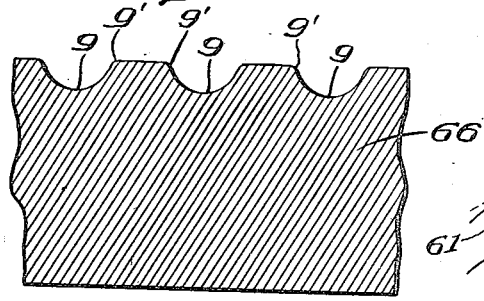
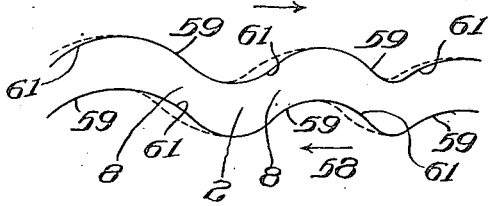
WITNESSES
INVENTORS
James W. Owen,
Albertis Hewitt.
BY
ATTORNEYS J. W. OWEN AND A. HEWITT.
METHOD OF MAKING RECORD TABLETS.
APPLICATION FILED DEC. 17, 1914. RENEWED APR. 21, 1919.
1,368,745.
Patented Feb. 15, 1921.
6 SHEETS—SHEET 6.
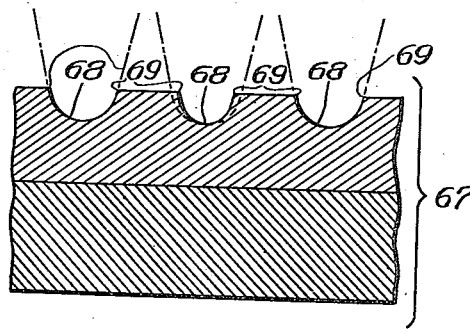
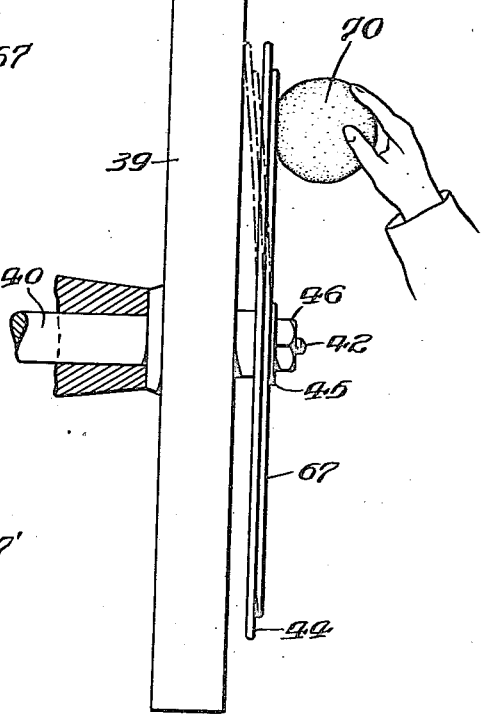
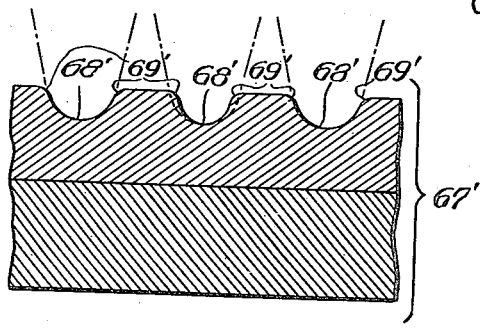
INVENTORS
James W. Owen,
Albertis Hewitt.
WITNESSES
BY
ATTORNEYS

UNITED STATES PATENT OFFICE.

JAMES W. OWEN, OF SECANE, PENNSYLVANIA, AND ALBERTIS HEWITT, OF CAMDEN, NEW JERSEY, ASSIGNORS TO VICTOR TALKING MACHINE COMPANY, A CORPORATION OF NEW JERSEY.

METHOD OF MAKING RECORD-TABLETS.

1,368,745. Specification of Letters Patent. Patented Feb. 15, 1921.

Application filed December 17, 1914, Serial No. 877,803. Renewed April 21, 1919. Serial No. 291,725.

*To all whom it may concern:*

Be it known that we, JAMES W. OWEN and ALBERTIS HEWITT, both citizens of the United States, and residents of Secane, in the county of Delaware, State of Pennsylvania, and of Camden, in the county of Camden and State of New Jersey, respectively, have invented certain new and useful Improvements in Methods of Making Record-Tablets, of which the following is a full, complete, and exact disclosure.

The invention of this application is capable of being applied to the art of making sound record tablets in a number of ways, and the relation which exists between the processes of this application and the processes by means of which sound record tablets have heretofore been produced, will be clearly set forth.

When a sound record groove is cut or engraved in a wax tablet in a well known manner, the said groove may vary slightly in width when measured at right angles to the direction of the groove at different points, and while this peculiarity or characteristic may not be a serious objection and may not interfere with the reproduction of sound from certain records, it is nevertheless desirable, in some instances, to eliminate this peculiarity. It may be readily understood that a cutting stylus, when vibrating rapidly and widely in a direction transverse to the general direction of the groove being formed thereby, might produce a groove which is constricted in width or narrower in certain portions thereof than in other portions, such narrow portions being generally where the vibrations caused by sound waves are frequent and of relatively great amplitude. In reproducing sound from a tablet having such a groove or variable width, a reproducing stylus might tend to jam or wedge in the narrower portions of the groove and consequently tend to rise out of such constricted portion. The narrowing of the groove at such points as have been above indicated, produces a tendency of the reproducing stylus or needle to rise from the bottom of the groove and ride upon the side walls of the groove and such an action of the reproducing stylus might tend to wear the groove or scratch the side walls thereof and injure the record of sound at such points. One of the objects of the present invention is to remove such peculiarities of the sound record groove of a sound record tablet.

It is well known that the quality of the sound which may be produced from a sound record tablet may vary somewhat with the shape of the groove in cross-section and with the depth of the groove. Inasmuch as sound record tablets are made in widely different parts of the world and by different individuals on different recording machines, with different cutting or engraving styli, the grooves of record tablets so formed may vary considerably both in width, shape and depth. The grooves of some tablets may be too shallow to produce the best reproduction of sound, and others may be too deep. The sound reproducible from a sound record tablet might, therefore, be improved if the groove were deeper in some cases or more shallow in other cases, or if the angle which the walls of the groove make with each other were different from that which is present in a particular record. The present invention has for one of its objects the alteration of the shape and depth of the grooves of sound record tablets, the master record of which has already been made, and to produce from such a record a sound record tablet having the record groove in the best form, shape or depth for that particular record.

Another object of this invention is to standardize the grooves of records so that whatever may be the depth and shape or form of the groove as originally recorded in the master sound record tablet, the commercial records formed therefrom may have substantially the same shape in cross-section, and the same depth, and width the same transverse to the median line of the groove at every point through the length of the sound record grooves.

It must also be apparent that, when commercial sound records are produced under the widely varying conditions above indicated, a reproducing needle of substantially fixed or standard size may or may not coöperate perfectly with the groove of a selected record in reproducing sound uniformly from these records. A reproducing stylus may fit the groove of one record and may not properly fit that of another. The action of the sound record tablet upon a reproducing stylus in reproducing sound from a selected record of an assortment of records formed under these various conditions, when the stylus does not properly fit the groove, is at first to grind and shape the end of the stylus until it conforms to the shape of the groove, and this action tends to injure the walls of the sound record groove when the stylus is too hard and does not substantially fit the groove.

A further object of this invention is to change and standardize the grooves of different sound record tablets wherever, or under whatever conditions, they may have been originally made, so that a commercial reproducing stylus, the end or tip of which is of a substantially fixed and predetermined shape, will perfectly fit the sound record groove of any tablet.

The volume of sound reproducible from a sound record tablet may also vary somewhat with the form and shape of the sound record groove. Our invention relates to the changing of the sound record groove so that a record which is too loud may be made to give a softer reproduction of sound, and, conversely, a record in which the sound reproducible therefrom is too soft or thin, may be changed by varying the shape, size or depth of the groove so that it is capable of reproducing sound with greater volume without substantially detracting from the quality of the tones in other respects.

Further objects of our invention are to produce a sound record tablet, the walls of the grooves of which are highly burnished or polished in order, among other things, to reduce the abrasive action and scratch between the stylus and the walls of the groove. A record having a sound record groove which is highly burnished or polished may be operated on a sound reproducing machine a greater number of times without substantial injury to the sound record tablet than a sound record tablet having a groove which is not polished or burnished. The invention, therefore, of this application relates to and has for one of its objects, the practice of a process by which the life of the sound record tablet may be greatly increased, and the production of a sound record tablet from which sound may be reproduced a greater number of times than it can from ordinary records without substantial injury to the walls of the sound record groove.

Our invention also has for its object, the providing of mechanism for altering, changing or modifying the shape, size or depth of a sound record groove; the construction of an apparatus by means of which a stylus of hard unwearing material is caused to track under pressure, throughout the entire length of a sound record groove formed in a metallic record, and to spin or spread the material at the side walls of the sound record groove or parts thereof, to increase the depth of the groove or change the shape of the walls as may be required, or as may be deemed expedient; and to make such alterations as are above indicated in the character of the sound record groove without destroying or impairing the reproducing sound properties of those undulations recorded therein.

Referring to the drawings forming a part of this application, Figure 1 shows in a diagrammatic manner the forming of a sound record groove in a wax tablet by a cutting or engraving process. The said figure indicates that a portion of the sound record groove has been formed by the cutting stylus and indicates that the groove is generally spirally arranged upon the face of the tablet, the arrow 4 indicating the direction in which the tablet is turned during the engraving or cutting of the sound record groove. It is, of course, to be understood that in actual practice, the convolutions of the sound record groove lie much closer to each other than is indicated in Fig. 1, and that the undulations do not appear to the eye in so pronounced a manner as that shown in the said figure.

Fig. 2 is a greatly enlarged diagrammatic plan view of a sound record groove having undulations corresponding to sound waves in the side walls thereof. In full lines is indicated such a groove as might be formed by a cutting or engraving tool in a wax or other suitable tablet when said stylus is vibrated rapidly under the influence of sound waves of relatively great amplitude, while in dotted lines is indicated diagrammatically the extent to which portions of the sound groove may be narrower than other portions as the edge of the cutting stylus vibrates laterally or transversely from one position to the other;

Fig. 3 is a view on the same enlarged scale as Fig. 2 of a sound record groove 9, such as may be produced from the sound record groove shown in Fig. 2 by the exercise or practice of the invention of this application. The sound record groove in Fig. 3 is of substantially uniform width at any point when measured at right angles to the median line of the groove;

Fig. 4 shows, on a greately enlarged scale, a section of a portion of a master record taken so that three consecutive convolutions of the groove show in transverse cross-section;

Fig. 5 indicates a metallic record made in any suitable manner from the master shown in Fig. 4 and stiffened with a metal backing;

Fig. 6 indicates the manner in which the sound record groove, such as is indicated in Fig. 2, is widened in the constricted portion by the passage therethrough of a spinning stylus or metal spinning tool of hard unwearing material;

Fig. 7 indicates another wax master record in which the groove is too deep and the side walls thereof are too nearly parallel, and Figs. 8 to 10 indicate the manner in which such a groove is changed to one of standard size and shape;

Fig. 11 indicates another wax master record, the groove therein being too shallow, and Figs. 12 and 13 indicate the manner in which the groove is made of proper depth;

Fig. 14 indicates still another wax master, in which the groove is too shallow and the side walls thereof make too great an angle with each other; and Figs. 15 to 17 indicate the manner in which a groove of proper dimensions and proportions is made therefrom;

Fig. 18 is a plan view of one form of apparatus which may be employed in changing the grooves of the metal records formed from the master records.

Fig. 19 is a side elevation of the said apparatus. In both Figs. 18 and 19 it is to be understood that a motor is employed to impart a slow movement of rotation to the turntable upon which the metal record is supported.

Fig. 20 is a sectional view taken on the line 20—20 of Fig. 19;

Fig. 21 is a greatly enlarged view of the spinning stylus such as is preferably employed in carrying out the invention of this application;

Fig. 22 is a diagrammatic view of one form of apparatus for brushing, polishing, and burnishing the face of a metal sound record tablet and the side and bottom walls of the sound record groove therein, and for lapping or grinding away the flat surface of the face of the metal record, when desired or required, and for rounding the upper edges of the sound record groove to make them merge into the top plane surface of the record;

Fig. 23 indicates, on a greatly enlarged scale and in a greatly exaggerated manner, how, in brushing, burnishing or polishing the sound record groove, the inactive wall of the groove may be that portion of the groove which is most greatly affected or modified thereby;

Fig. 24 indicates on the same scale as Figs. 4 to 17 the finished metal record produced by the exercise of this invention;

Fig. 25 shows a metallic matrix or die, formed in any suitable manner, from the metal record in Fig. 24; and Fig. 26 indicates the finished sound record tablet pressed or otherwise formed from the matrix shown in Fig. 25.

Figs. 27 to 29 illustrate diagrammatically the steps in connection with the removal of the sharp corners between the side walls of the record groove and the plane face of the record.

It is to be understood that in Figs. 4 to 17 inclusive and 24 to 26 inclusive the section is supposed to be taken radially of the tablet and that the stylus tip, shown in dot and dash lines therein, illustrates in an exaggerated manner the correspondence or lack of correspondence, in cross sectional shape or proportion between the sound record groove with which it is compared, and the groove which may be ultimately produced by the practice of the invention of this application.

It is understood that the fragments of sound record tablets are shown in Figs. 4 to 17 and in Figs. 24 to 26 inclusive on a greatly enlarged scale for the sake of clearness in ilustration and that the variations in the shape, form and size, and depth of the different grooves may be shown as greatly exaggerated. The tip of the spinning stylus illustrated in Figs. 6, 10, 13, 16 and 21 is shown on a correspondingly enlarged scale.

In Fig. 1 is represented a wax tablet 1 upon which a laterally undulatory spirally arranged sound record groove 2 of even depth is indicated as being formed, the double wavy line representing that portion of the groove which has already been formed and the dot and dash line 3 representing the spiral path which the cutting tool will substantially follow while cutting the remaining portion of the groove. In actual practice the convolutions of the spiral groove lie very closely to each other, as is well understood by those versed in the art. The portion of the groove 2 in Fig. 1 which is inclosed by the bracket may be taken or assumed to be that portion of a sound record groove 2 which is illustrated in full lines on a greatly enlarged and exaggerated scale in Fig. 2. In making this sound record groove 2 in the tablet 1, the said tablet 1 is preferably rotated in the direction of the arrow 4; that is to say, clockwise, and the cutting stylus is fed slowly radially of the record tablet from the outer edge thereof toward the center during the recording process to produce a continuous groove arranged generally spirally in the face of the tablet.

In Fig. 2 the undulations in the side walls of the sound record groove when formed by the cutting stylus 5 (indicated diagrammatically in section) are shown in full lines and the extreme movement and direction of the cutting stylus 5 during the recording of the sound record groove 2 is indicated by the double headed arrow 6; that is to say, the cutting stylus may be assumed to vibrate parallel to the arrow 6, the limits of the said vibration being the heads of the said arrow 6.

When the plane of the cutting edge of the stylus 5, vibrated under the influence of sound waves, extends substantially radially of the tablet 1, the groove 2, formed in the face of the tablet 1, will be constant in width when measured parallel to the plane of the cutting edge of the stylus; i. e., parallel to the arrow 6, but the said groove will be variable in width when measured at right angles to the median line 7 of the groove. Of course, in actual practice, these variations in the width of the groove 2 are relatively small but there may be relatively narrow or constricted portions 8 particularly where the vibrations are frequent and the amplitude is great. It must be borne in mind, however, that the showing in Figs. 1 and 2 is diagrammatic and exaggerated for the purpose of clearly illustrating these peculiarities which are more or less common to sound records formed with a cutting stylus.

After such a groove as is indicated in full lines in Figs. 1 and 2 has been formed in the wax or other suitable material constituting the master sound record tablet, and a metal record has been formed therefrom, that groove in said metal record may be altered or changed to a groove 9 in which the width is uniform when measured at right angles to the median line thereof. The relation which such a changed or altered sound record groove 9 (shown in Fig. 3) bears to the original sound record groove shown in Fig. 2 is indicated in dotted lines in Fig. 2. It is the purpose of this invention to change a sound record groove such as is illustrated in Fig. 2 to a groove 9, such as is shown in Fig. 3 without injuriously affecting the quality or characteristics of the tone originally recorded. The peculiar characteristics of the tone which were originally recorded will remain substantially the same, but the volume and the quality of the tone and the smoothness of the reproduction may be greatly improved by the exercise of the invention of this application in changing the shape, form or size of the sound record groove.

In explaining how a record groove of the character shown in Fig. 2 may be changed to that shown in Fig. 3, reference will first be had to Figs. 4, 5 and 6, in which Fig. 4 shows a fragment of a wax master record tablet 1 having in the face thereof three consecutive convolutions of the sound record groove 2, the intermediate of the three sections of the groove being shown as sectioned at one of those constricted and narrow portions 8 shown in Fig. 2. The cross-sectional width, depth and shape of the sound record groove at its widest points may be assumed in this instance to be correct and as not requiring any change or modification, thus making the only thing to be effected in the grooves of this particular record to be that of changing the same from a groove having a variable width when measured at right angles to the median line thereof (such as is shown in full lines in Fig. 2) to a groove of uniform width when measured at right angles to the median line thereof (such as is shown in Fig. 3).

The first step of the process then is to form from the wax master 1 of Fig. 1, a metal record, the groove of which is a duplicate in every particular of the sound record groove 2 of the wax master record 1. This duplicate may be formed in any suitable manner as is well understood by those skilled in the art, as for instance by an electroplating process, and in Fig. 5 is shown a metal record so formed, the same consisting of a shell 10, formed by an electroplating process, having a sound record groove 2 therein which is an exact duplicate of the sound record groove 2 in the wax master 1. In this shell 10, therefore, the intermediate convolution will contain the same narrow portion 8 as that present in the wax tablet 1, shown in Fig. 1. The shell 10 is preferably backed by a stiff plate or disk of metal 11 in order to give rigidity to the same, and the shell 10 and metal backing 11 together form a metal record 12.

After the metal record 12 has been formed, it is often desirable to subject the same to a brushing or polishing process to burnish the side and bottom walls of the sound record groove therein and to remove any slight irregularities in the walls thereof, which, if not removed, might produce a "scratch" during the reproduction of sound therefrom. This polishing or brushing step may be performed upon the apparatus illustrated in Fig. 22, in which a face plate 39 mounted upon the end of a shaft 40 suitably journaled in the bearing 41 is arranged to be rotated at any desired speed by any suitable driving mechanism (not shown). From the front of the said face plate 39, a spindle 42 projects far enough to permit of the fitting thereover of a washer 43, a flexible metal plate 44, the metal record 12, a washer 45 and a nut 46 whereby the metal record 12 is rigidly secured to the spindle 42 and shaft 40, spaced at a short distance from the face plate 39 and backed by the flexible metal plate 44. The shaft 40 is then revolved and a suitable soft brush 47 impregnated with a suitable abrasive, such as electroshine diluted with gasolene, is manually pressed against the face of the metal record 12. The shaft 40 is rotated rather rapidly, and the said brush is slowly worked by the operator back and forth over the face of the metal record 12 with the result that the brush enters into the grooves in the face of the metal record, and the side and bottom walls of said grooves are smoothed, burnished and polished, and any imperfections or irregularities therein which are not removable by the spinning process, to be later described, are eliminated. The shaft 40 during said polishing process is revolved, generally speaking, anti-clockwise, because the sound is generally reproduced from sound records while the record is being rotated clockwise. In other words, during the polishing process the metal record is preferably revolved in the reverse direction to that in which the record would be revolved in reproducing sound therefrom.

The brush 47, with the polishing material thereon, enters into the groove and highly polishes the side and bottom walls of the same.

After having been brushed as aforesaid with "electroshine," which has a slight abrasive action upon the face of the metal record, as above indicated, the record may then be subjected to a further brushing step, a soft brush in this second step being preferably impregnated with a much finer polishing material, such for instance as gold rouge, and pressed against the face of the metal record to impart to the surface of the record and the side and bottom walls of the groove therein a very high and smooth polish.

There is another result which is effected during the burnishing process just above described, which is quite important. It has been above noted that during the burnishing of the walls of the sound record groove, the metal record 12 is preferably revolved in the opposite direction to that in which it would be revolved in reproducing sound therefrom. This reverse rotation of the disk, therefore, subjects that wall of the sound record groove which is inactive during the reproduction of the sound from the record to greater wear or abrasive action during the polishing process than the active portion of the wall of the groove which is active at that selected point. To clearly illustrate what is meant by the above, attention is called to Fig. 23 wherein is diagrammatically indicated a sound record groove 9 provided with a few undulations. Now, if during the reproduction of the sound from the record containing that groove the movement of the groove with respect to the reproducing stylus be in the direction of the arrow 58 then those parts 59 of the walls of the sound record groove are the parts which are really active during the reproduction of sound from those particular undulations in vibrating the reproducing stylus laterally. It must, therefore, be apparent that if the metal record 12 during the polishing processes be rotated in the reverse direction,—that is to say, in the direction of the arrow 60,—the action of the brush impregnated with "electroshine" will be most pronounced on those portions 61 of the wall of the sound record groove; that is to say, upon the inactive portions of the walls of the sound record groove. It, therefore, follows that the quality and tone characteristics of the sound record groove are very slightly, if any, changed or modified by the polishing process for the brunt of the polishing will fall upon the inactive wall of the sound record groove and should that portion of the groove be constricted or narrow, for the reasons above fully set forth, then the action of the burnishing brush on the groove will be that of tending to widen the groove at the constricted or narrow portions without injuriously affecting the active wall and consequently without injuriously affecting the sound reproducible from the sound record groove.

To change now the groove of the metal record 12 from one of varying to one of uniform width as has heretofore been referred to, this metal record 12 is subjected to the action of a hard unwearing stylus which is held with considerable pressure in the groove thereof and is caused to slowly track throughout the length of the sound record groove. One apparatus for performing this step of the process is shown in Figs. 18 to 21 in which a spindle 13 is journaled in a suitable base or standard 14, the top of which is provided with a circular turntable 15 or other rotary support upon which the metal record 12 may be mounted. Upon the top of the base or support 14 is a bracket 16 provided with two alined conical bearing points 17 and 18. The point 17 may be rigid with respect to the bracket 16, while the point 18 may be movable vertically relatively to the bracket in an opening in alinement with the point 17. A spring 19 tending to force the point 18 toward the point 17 may be mounted within the bracket 16 and the tension of said spring 19 may be varied by means of an adjusting screw 20.

Between the conical bearing points 17 and 18 is a stiff support 21 rotatable upon the bearing points 17 and 18 as centers. Extending outwardly from the support 21 is a clamp 22 preferably provided with a socket 23 within which one end of a resilient spring rod 24 is securely held by a set screw 25. The clamp 22 is adapted to be rigidly secured to the support 21 at any point throughout the length thereof by means of a set screw 26. The outer end of the resilient spring rod 24 is provided with a transverse hole or opening to receive the upper end of the stylus 27, secured therein by a set screw 24'

This stylus 27 preferably consists of a cylindrical shank 28 of steel or other hard material, a stylus tip 29, preferably a jewel such as a sapphire or a diamond, and a coupling 30 for firmly uniting said tip and shank. This stylus is shown on an enlarged scale in Fig. 21.

If the turntable 15 is arranged horizontally, then the axis upon which the stiff support 21 rotates, should be vertical in order that the arm or rod 24 may swing over the metal record 12 in a horizontal plane, but should the turntable 15 be arranged in any other position, then the axis, upon which the stiff support 21 turns, should, of course, be substantially at right angles thereto, in order that the arm 24 may swing in a plane parallel to the turntable.

The lower end of the stylus tip 29 is preferably substantially conical in shape, although the same may terminate in a rounded point. The extreme lower end of the stylus tip 29 is preferably rounded to exactly fit into a properly formed sound record groove.

The requisite amount of resiliency or yield to the rod 24 may be obtained by reducing the diameter of portions 24'' of the same and in carrying out the invention of this application, a number of rods 24 are preferably made available, each differing from the others in stiffness, the variations between said rods depending upon the material of which they are made, and the diameters and lengths of the various portions of the same. In other words, by providing a rod of given diameter with a greater number of portions of reduced diameter, or by varying the length of the reduced portions of the rod, the flexibility of the rods may be varied so that a rod having the proper amount of resiliency may be selected for use in connection with any selected metallic record dependent upon the character of the changes which are to be made in the record groove therein.

In setting up the apparatus, the rod 24 is normally horizontal; that is to say, in a plane parallel to the top of the turntable 15, and consequently, parallel to the top of the metal record 12, and the tip 29 of the stylus 27 is below the top of the metal record as indicated in dotted lines in Fig. 19. The end of the rod 24 is then sprung upwardly by the operator and swung over toward the center of the turntable so that the tip 29 of the stylus will rest in the outer end of the spiral groove. The pressure with which said stylus bears upon the said metal record will depend upon the position to which the the clamp 22 has been previously adjusted on the stiff support 21.

Before the tip 29 of the stylus 27 is actually placed in the spiral groove of the metal record, the surface of the metal record is preferably given a thin layer or coating of a suitable lubricant, such as lard oil. The pressure with which the tip 29 engages the metal record during the operation of the device, is dependent upon the kind of a change which is to be made in the sound record groove. It may be said, however, that the tension of the rod 24 is so adjusted as above described that the tip 29 bears with considerable pressure against the surface of the metal record.

After the surface of the metal record has been lubricated as above described and the jewel tip 29 is placed at the end of the sound record groove nearest the periphery of the tablet, the metal record 12 is slowly revolved clockwise (as indicated by the arrow in Fig. 18) preferably at a speed of from two to five turns per minute. It will be noted that the jeweled tip 29 traverses the groove in the metal tablet in the same direction that a stylus would traverse the groove during the reproduction of sound. It is, of course, understood that the spindle 13 is connected to any suitable motor or driving mechanism (not shown) whereby the metal record is given a substantially constant speed of rotation.

As the turntable 15 and the metal record 12 carried thereby is thus slowly revolved, the tip 29 of the stylus will exactly track or follow in the groove 9 of the metal record 12, until it has traversed the entire length of the sound record groove, and in doing so, will faithfully follow all the minute undulations in the side walls of the sound record groove. The jewel tip 29 will, however, spin or spread the metal forming the walls of the sound record groove in those places where the said groove is narrower or of different shape or size from that of the tip of the stylus itself, and make all parts of the groove 9 so formed uniform and of the shape in transverse cross section of the stylus tip.

The backing 11 of the metal record 12 serves to give the metal record rigidity and prevents the same from vibrating during the spinning out of the sound record groove in the face of the tablet, it being obvious that any vibration or chatter of the metal record during this operation would tend to roughen the groove or produce foreign undulations in the surface of the same.

The angle which the stylus 27 makes with the plane of the metal record 12 is preferably just as near 90° as possible; that is to say, the nearer perpendicular to the surface of the record the stylus is, the more uniform in transverse cross section will be the groove ultimately formed. It has been found, however, that the stylus is liable to vibrate or chatter when the angle which it makes with the surface of the metal record is exactly 90°. It is, therefore, preferable to give the stylus a slight backward rake, and good results are obtained when the stylus is set at an angle of from 80° to 88° to the plane of the top surface of the metal record.

In this way, a sound record groove, such as is shown in full lines in Fig. 2 and which is variable in width when measured at right angles to the median line thereof, may be changed by this spinning process to a groove in which the constricted or narrower portions 8 thereof are widened, and made in form, shape and size like that of the other parts of the said groove; that is to say, to a groove 9 such as indicated in Fig. 3, in which the width of the groove is substantially uniform when measured at right angles to the median line thereof at any selected point in the groove.

Referring now back to Fig. 6, the tip 29 of the stylus is shown as having traversed that convolution to the right of the stylus, and since the cross sectional shape of that convolution at the particular point shown was originally the same as that of the tip of the stylus, substantially no change was produced therein by the stylus. The tip is shown as being in the intermediate convolution which in Figs. 4 and 5 is shown to be one of the narrower or constricted portions 8 of the groove. In traversing this narrow or constricted portion, the stylus has spun out slightly the metal of the walls of the groove. The stylus tip 29 in said Fig. 6 is shown as making the shape and size of the convolution 8, in cross-section, substantially exactly like that of the convolution through which the stylus tip has already passed and like the convolution shown to the left of the stylus through which it will next pass.

But this invention is not limited to making of changes in portions only of the sound record groove. The shape and size of the groove may be altered in other respects as will be now described.

It may happen that the original sound record groove is not correctly made. The groove in transverse cross-section may not be of the desired shape or size throughout its length, and not at separate points or places only. Some records may be provided with grooves, the side walls of which are too nearly straight or are too widely diverging to produce the best reproduction of sound therefrom. Some grooves may be too deep and others too shallow to produce the proper character of tone. By the exercise of the invention of this application, almost any kind of a sound record groove may be remodeled or changed to a correct or standard or desired form.

Considering now Figs. 7 to 10, it being still borne in mind that the drawings are on a greatly enlarged and exaggerated scale to plainly illustrate the features about to be described, Fig. 7 illustrates a cross-sectional view of a fragment of a wax or other master record 31 provided with a sound record groove 32. This groove may be a groove of varying width; that is to say, having narrowed or constricted portions like the groove 2 of Fig. 2, but the particular peculiarities to be considered at this time are that the groove is too deep and too narrow and the side walls thereof are too nearly perpendicular. For the purpose of illustration, let it be assumed that the groove should not have been deeper than the distance from the dot and dash line 33 to the bottom of the groove, that is to say, that the groove is too deep by the distance between the top surface of the record tablet and the dot and dash line 33, and that the angle the side walls should make with each other is that of the tip 29 of the stylus, also shown in dot and dash lines in said figure. By the exercise of the invention of this application, a record having a record groove of the desired and correct size, form and depth may be readily made. In this instance, the first step of the process is to produce from the wax or other master record 31 a metal record 34 similar to the metal record 12 previously described in that it consists of a shell 35 suitably stiffened by a backing consisting of a stiff plate or disk 36. This metal record 34 may be made by any well known process, such as the electroplating process, so that the sound record groove therein will be of exactly the same shape and size as that in the wax master record 31.

The face of the metal record 34 is then lapped or ground down or polished away until the groove therein is of substantially the proper depth, and in the particular instance illustrated in Fig. 8, the material of the face of the record should be ground substantially down to the dot and dash line 33.

The lapping or grinding of the face of the metal record 34 to produce a groove 38 of the correct depth may be performed on the apparatus shown in Fig. 22, and in a manner similar to that of "brushing" or "polishing," as heretofore described except that a yielding substantially flat pad, impregnated with "electroshine" and gasolene, or any other suitable abrasive is used instead of the brush 47. The metal record 34 is secured to the spindle 42 as was the metal record 12, as above described, and similarly backed by the flexible metal plate 44. The shaft 40 is then revolved while said pad, impregnated with the abrasive, is manually pressed against the face of the metal record 34. The shaft 40 is rotated rather rapidly and the pad is slowly worked by the operator back and forth over the face of the metal record 34 with the result that the face of the metal record 34 is lapped or worn away or ground and polished down until the sound record groove therein is of the proper depth. In pressing the brush 47 against the face of the metal record 34, the said record, together with the flexible backing plate 44, will yield slightly rearwardly so that a perfectly smooth even lapping of the surface may be readily effected.

The shaft 40 may be rotated in either direction during the lapping of the surface of the metal record, but it is preferable to rotate the same so that the tablet will turn counter-clockwise or in the reverse direction to that in which a commercial sound record tablet, similar to the metal record 34, will be rotated during the reproduction of sound therefrom.

After the surface of the metal record 34 has been so lapped and ground down, it is then "brushed" in the manner above described, first with a soft brush impregnated with "electroshine" and gasolene, as above described, and afterward with a soft brush impregnated with gold rouge or similar material, the result being that the face of the record and the walls of the groove are given a very high polish.

After the metal record 34 shown in Fig. 8 has been brought down to the form and shape indicated in Fig. 9,—that is to say, when the metal record 34 has been changed into the metal record 37 by the lapping and brushing processes above set forth,—the said metal record 37 is placed upon the turntable 15 of the apparatus shown in Figs. 18 and 19 and the stylus 27 is caused to traverse the sound record groove 38 therein as previously described, to slightly displace the metal of the side walls of the sound record groove to make it correspond in shape and size to the tip of the jewel pointed stylus which is of the correct form. In Fig. 10, the stylus tip 29 is shown as traversing across that portion of the sound record tablet 37 which is illustrated in Fig. 9, and it is assumed to have traversed through the groove to the right of the said stylus, to be spinning the intermediate groove, and to not have reached the groove 38 to the left of the said stylus. The groove to the right of the stylus tip 29 is shown as having been re-formed by the spinning action of the tip 29 into a groove 9 of the correct, proper and desired shape, form and size. In spinning the sound record groove of the metal record 37 as previously described, the face of the metal record is first given a thin film of pure lard oil or other suitable lubricant.

In Figs. 11 to 13 inclusive is diagrammatically shown the manner in which a groove which is too shallow is changed into one of the proper depth. In Fig. 11 is illustrated an enlarged fragment of a wax or other master sound record 48 having a sound record groove 49 therein which is too shallow. As has been previously described, a metal record 50 similar to the metal records 12 and 34 and having a sound record groove 49 exactly like the sound record groove 49 of the wax tablet 48 is first formed. The metal record 50 is first subjected to the "brushing" step, to polish the groove and to remove irregularities therefrom, and is then placed upon the turntable 15 of the apparatus shown in Figs. 18 and 19, is suitably lubricated, as above described, and rotated to cause the stylus tip 29 to traverse the length of the groove under such pressure as may be required to produce a groove of the proper depth. It is not, however, necessary that the proper and correct depth of groove be attained by a single passage of the stylus therethrough. The operation may be repeated as many times as is necessary to produce the correct form and depth of groove. In Fig. 13 the stylus is shown as being located in the intermediate convolution of the groove of the fragment of the metal record 50, as having traversed the groove to the right of the stylus and as having not yet entered the groove to the left of the said stylus.

In Fig. 14 is shown a wax master record 51 having a sound record groove 52 therein which is too shallow and too wide and the side walls of which form too great an angle with each other and Figs. 15 to 17 inclusive indicate the manner of producing a metal record therefrom having a groove of the correct shape and size. As has been heretofore described, the first step is to make from the wax or other master record 51 a metal record 53 similar to the metal records 12, 34 and 50, and having a groove 52 therein exactly like the groove of the wax master record 51. After this has been done, the surface of the metal record 53 is lapped in the manner above described, say to the dot and dash line 54, so that the record groove is of the correct width, and no further substantial lapping or grinding of the upper surface will be required, and after the face of the record 53 has been so lapped, the walls which remain of the sound record groove 52 therein are preferably subjected to the " brushing " step, as heretofore described, to remove the imperfections in the walls of the record groove to polish the same. This having been done, the record 55 provided with the record groove 56 will result. Said record 55 is then placed upon the apparatus shown in Figs. 18 and 19, is lubricated and the groove 56 therein is spun out in the manner heretofore described, as plainly indicated in Fig. 17, to form a finished metal record 57 having a groove 9 therein of correct or desired shape in cross section, and of proper size.

If by reason of the passage of the spinning stylus tip 29 through the groove of the metal record, the displaced metal should rise above the plane of the surface of the metal record, the surface may again be lapped sufficiently to remove the same after the spinning step and to produce a polished or burnished surface. It is to be observed that after the metal records 12, 37 and 50 and 57 shown in Figs. 6, 10, 13 and 17 respectively have been formed as above described, in each case the resulting metal records will all be substantially like that shown in Fig. 24. Therefore, whether the groove of the master record be of the kind shown in Figs. 4, 7, 11 or 14, the final metal record will, by the practice of this invention, be a "standardized" metal record 57 indicated generally in Fig. 24, having a groove 9 therein of uniform width when measured at right angles to the median line thereof and of uniform size and shape.

After the metal sound record 57 has been formed, in the manner above fully set forth, a negative is made therefrom in any suitable manner, as for instance, by forming from the recorded surface of the metal record 57, an electrotype or shell 62 in which the record of sound is in the form of a ridge 63, and after the said shell 62 is backed with a stiff metallic backing 64 may be used as a master die or matrix 65 from which commercial records 66 may be pressed or formed in any usual or well known manner. The die 65 may, however, be preserved as a master matrix from which other dies for pressing records, may be formed in any old and well known manner. The sound record groove 9 of the finished commercial record 66 will be identical in shape, size and form with the groove 9, of the metal record 57, and the face of the said record 66 and the side and bottom walls of the groove 9 therein will be very smooth and free from irregularities, scratches or other undesirable features more or less common to record tablets not made in accordance with this invention. Moreover, the sound record groove 9 of the commercial record 66 will be of uniform width when measured at right angles to the median line thereof at any selected point for that was the shape of the groove 9 which was formed in the metal record 57 by the passage of the tip 29 of the spinning stylus therethrough, and the sound which is reproducible from the groove 9 in the record tablet 66 will have the same desired characteristics as the sound originally recorded in the master record.

The action of the tip 29 of the spinning stylus in traversing the groove of the metal records is to slightly spin or displace the metal of the walls of the groove. The brushing or burnishing of the walls of the sound record groove improves the same because it tends to remove therefrom those minute scratches or irregularities which are apt to occur in the walls of the grooves of sound record tablets. The finished groove 9 of the metal record 57 such as is shown in Fig. 24 and the walls of the groove 9 of the commercial record 66 formed therefrom will be exceedingly smooth and free from scratches and irregularities. The smooth walls of the groove tend to greatly reduce the friction between the reproducing stylus and the walls of the groove, and sound record tablets having such a smooth sound record groove as is producible by the process above described, have a longer life than ordinary sound record tablets made by other processes.

In describing the invention and the manner in which the sound record grooves therein may be changed, altered or modified, the tablets 1, 31, 48 and 51 have been referred to as "wax master" tablets, but it is to be understood that it is not necessary that the metal records be made directly from a wax master tablet. The groove of a commercial sound record tablet or of a given metal record may not be of the proper or desired form or size in cross-section. From such a record tablet the metal record duplicates 12, 34, 50 and 53 may be formed and the groove in such metal record duplicates may be modified in the manner which has been above described. Moreover, the primary sound record tablet may be a die or matrix as distinguished from a metal record such as has been above described. In such a die or matrix, the record of sound is in the form of a ridge or counterpart of the groove to be formed therefrom. It is obvious that such a metal record as is indicated in Figs. 5, 8, 12 and 15 may be formed by an electroplating or other suitable process, directly or indirectly from such a die or matrix, and if the sound record groove which is to be formed from such a die or matrix is too shallow or too deep, or has the objectionable characteristics which have been above referred to, it is obvious that from said die or matrix a metal record may be produced which may be subsequently treated to produce a metal record having the correct form of groove by the steps above described. Therefore, in its broader aspect, the record tablets shown in Figs. 4, 7, 11 and 14 may be more properly termed "primary record tablets" whether they be wax masters or other forms of record tablets or matrices and in the claims of this application the expression "primary sound record tablet" is to be construed in the light of the above explanation as referring to any form of a sound record tablet from which a metal record duplicate such as is shown in Figs. 5, 8, 12 and 15 may be produced in any well known manner.

The jewel tip of the stylus may be of any desired shape in longitudinal cross-section which may be considered a desired shape to give the transverse cross-section of the sound record groove from which the record groove originally produced in the first wax record differs in cross-sectional shape and which it is desired to standardize. The jeweled tip is preferably substantially paraboloidal in shape. This does not necessarily mean that the generating curve is a true parabola, for in some cases, if desired, the generating curve of the tip of the stylus may be an ellipse or even approximately an arc of a circle. It should be remembered, however, that the depth of a sound record groove is exceedingly minute and within the distance bounded by the walls of a sound record groove, the curve of a parabola, of an ellipse, and an arc of a circle may so closely approach each other as to make it rather difficult to distinguish between them. When, therefore, for brevity the word "paraboloidal" is used in the claims, we mean that within the limits of the depth of a sound record groove, the shape of the tip resembles or approximates that of a paraboloid whether the generatrix of the curve of the tip be a true parabola, a true ellipse, a substantially circular arc, or a straight line making an angle to the axis of the stylus and provided with a smooth curve where the generatrix meets the axis. Since the preferred form of a standard sound record groove of the gramophone type is of cross sectional shape closely approximating a parabolic curve, the word "paraboloidal" is employed to designate the preferred shape and form of the tip of the spinning stylus.

It is to be noted that in the practice of the invention as hereinbefore set forth, certain of the steps relating to the treatment of the metal record to correct the sound groove, such as for instance, the lapping or grinding of the face of the metal record by the use of the substantially flat pad and suitable abrasive material, may have a tendency to wear away, remove or round off any sharp corners which may exist at the intersection of the side walls of the sound record groove and the plane face of the metal record being treated. However, the tendency to round such corners as just described is merely incidental, and in any instance where the sharp corners exist to a marked degree in the master record in wax and therefore in the duplicate thereof formed in metal, it has been found desirable to employ a separate step to positively effect the rounding of the sharp corners to eliminate the same from the commercial record.

As the preferred means for accomplishing this end, it is contemplated by this invention to subject the metal record to the action of a soft or yielding pad having a rounded or substantially spherical surface for contacting with the face of the metal record. In its preferred form this soft pad is substantially the shape of a ball. The pad is impregnated with any suitable abrasive material, such as "electroshine," and is worked back and forth across the face of the metal record while the same is rotated upon the apparatus illustrated in Fig. 22.

The action of this rounded pad in removing the sharp corners is more effective than the flat pad which is employed, as previously described, for lapping or grinding away the face of the metal record, since the rounded surface of this soft pad or ball permits the same to accommodate itself to the surface of the record and enter to a certain extent between the side walls of the sound record groove to bear directly upon and wear away the sharp corners.

The removal of the sharp corners by the step just described may be effected at any suitable time in the treatment of the metal record to correct the groove, and preferably this step for rounding the corners is performed following any burnishing of the groove with the brush, and also following the lapping of the face of the metal record, if any lapping has been necessary, and just before the tracing of the groove with the hard stylus. The removal of the sharp corners or edges from the metal record will remove any sharp corners in the pressing matrix subsequently made therefrom and between the face of the matrix and the side walls of the ridge, and therefore the commercial record pressed from the matrix will also be free from any such sharp corners or edges and will be, of course, a substantial duplicate of the metal record after correction. The rounding or removal of the corners or edges tends to lengthen the life of the commercial record tablet because as the reproducing needle wears, during the reproduction of sound therefrom, the upper surface of the tablet does not engage the sides of the stylus and hence does not produce shoulders on the stylus which roughen and break the walls of the groove therein.

For the purpose of illustration, this step for removing the sharp corners is shown diagrammatically in Figs. 27 to 29, in which Fig. 27 shows in section and on a greatly enlarged scale, a metal record 67 with certain convolutions of the sound record groove 68 and the sharp corners 69 at the intersection of the side walls of the groove with the plane face of the record, this metal record being a duplicate of an original or master record in wax (not shown) and having been formed therefrom in any suitable manner, as hereinbefore described. In the metal record shown in this instance, the sound record groove is of the proper size and transverse section, but it is necessary to remove the constricted portions in the lateral vibrations thereof to provide a "standardized" groove. Before tracing the groove to remove these constricted portions, the metal record is placed upon a suitable metal plate 44 and rotated with the same and the shaft 40, this rotating apparatus being that heretofore illustrated and more particularly described in connection with Fig. 22. While the metal record 67 is rotated on the said apparatus, the soft round pad or ball 70 impregnated with "electroshine" or other suitable abrasive material is held against the face of the metal record, as illustrated in Fig. 28, and is moved across the same to wear away the sharp corners 69. The metal record 67' after removal from the rotating apparatus is shown in Fig. 29, and has at the intersections between the side walls of the record groove 68' and the plane face of the record the rounded corners, 69'. Following this step, the metal record is traced to remove the constricted portions, and a pressing matrix is then formed therefrom and employed to produce commercial records, but as the steps following the rounding of the corners are similar to those hereinbefore specifically described, no repetition thereof is deemed necessary.

Of course, it will be obvious that the practice of this step for rounding the corners or edges of the sound groove is not limited to use with the particular form of groove illustrated in Figs. 27 and 29, nor in connection with any other particular steps for the alteration of a metal record, whether those steps be the treatment of a metal record to correct a groove which is too shallow, too deep or too wide, or otherwise defective in size or transverse cross section, or whether the treatment is merely to remove the constricted portions in the lateral vibrations of the groove, and the said step for removing the sharp corners may be introduced or omitted in connection with the treatment necessary in any of the particular instances, as occasion requires.

Having thus fully described our invention, what we claim and desire to protect by Letters Patent of the United States is:

1. The method of changing a sound record groove from one of uniform width when measured parallel to the plane of the oscillation of the stylus by means of which the same was recorded, to a groove of uniform width when measured at right angles to the direction of the groove at any selected point, which consists in causing a stylus composed of material which is not substantially abraded by the tablet in which said record groove is formed to traverse under pressure against the walls of said groove throughout the length of the sound record groove.

2. The method of changing a sound record groove from one of uniform width when measured parallel to the plane of the oscillation of the stylus by means of which the same was recorded, to a groove of uniform width when measured at right angles to the direction of the groove at every point, which consists in causing a stylus having a paraboloidal tip composed of a material which is not substantially abraded by the tablet to traverse under pressure throughout the entire length of the sound record groove.

3. The method of changing a sound record groove from one of uniform width when measured parallel to the plane of the oscillation of the stylus by means of which the same was originally recorded, to a groove of uniform width when measured at right angles to the direction of the groove at every point, which consists in yieldingly pressing the tip of a spinning stylus composed of a material which is not substantially abraded by the tablet and which is of substantially paraboloidal shape against the walls of said groove, and causing said stylus to traverse throughout the entire length of the sound record groove to displace the material of the walls of the sound record groove and make the same substantially conform to the shape of the longitudinal section of the tip of said stylus.

4. The method of changing a sound record groove from one of uniform width when measured parallel to the plane of the oscillation of the stylus by means of which the said groove was originally recorded, to a groove of uniform width when measured at right angles to the direction of the groove at any selected point, which consists in holding the tip of a spinning stylus in said sound record groove under substantially uniform but yielding pressure, and causing said stylus to traverse throughout the entire length of the sound record groove to displace the material of the walls of said groove in those places where the groove is narrow when measured at right angles to the direction of the groove at that point.

5. The method of changing a sound record groove of substantially any shape in cross section, to a groove the cross section of which is substantially paraboloidal and of uniform width when measured at right angles to the direction of the groove at any selected point, which consists in causing a stylus composed of material which is not substantially abraded by the tablet and of substantially paraboloidal shape to traverse under pressure throughout the length of the sound record groove.

6. The method of changing a sound record groove of substantially any shape in cross section, to a groove the cross section of which is substantially paraboloidal and of uniform width when measured at right angles to the direction of the groove at any selected point, which consists in causing a stylus composed of material which is not substantially abraded by the tablet and of substantially paraboloidal shape to traverse under pressure throughout the length of the sound record groove in the same direction as a reproducing stylus would move with respect to said groove in reproducing the sound recorded therein.

7. The method of making a sound record tablet, which consists in making by electrodeposition a shell or electroplate having in the face thereof an exact duplicate of the sound record groove in a sound record tablet, backing up said electroplate to form a metal record, placing a stylus having a paraboloidal tip of a material which is not abraded by said metal record in one end of said groove of said metal record, and holding the same therein under pressure and causing said stylus to track throughout the length of said groove and follow the undulations therein, the pressure between the tip of said stylus and the walls of said groove being sufficient to slightly displace the metal in engagement with said stylus.

8. The method of making a sound record tablet, which consists in making by electro-deposition a shell or electroplate having in the face thereof an exact duplicate of the sound record groove in a sound record tablet, backing up said electroplate to form a metal record, lapping the face of the metal record to reduce the depth of the groove in said metal record, placing a stylus having a paraboloidal tip of a material which is not abraded by said metal record in one end of said groove of said metal record, holding the same therein under pressure and causing said stylus to track throughout the length of said groove and follow the undulations therein, the pressure between the tip of said stylus and the walls of said groove being sufficient to slightly displace the metal in engagement with said stylus, and forming from the resulting metal record a die or matrix in the face of which is a negative of the finished groove in said resulting metal record.

9. The method of making a sound record tablet, which consists in making by electro-deposition a shell or electroplate having in the face thereof an exact duplicate of the sound record groove in a sound record tablet, backing up said electroplate to form a metal record, lubricating the surface of said metal record, placing a stylus having a paraboloidal tip of a material which is not abraded by said metal record in one end of said groove of said metal record, and holding the same therein under pressure and causing said stylus to track throughout the length of said groove and follow the undulations therein, the pressure between the tip of said stylus and the walls of said groove being sufficient to slightly displace the metal in engagement with said stylus.

10. The method of making a sound record tablet, which consists in making by electro-deposition a shell or electroplate having in the face thereof an exact duplicate of the sound record groove in a sound record tablet, backing up said electroplate to form a metal record, lapping the face of the metal record to reduce the depth of the groove therein, lubricating the surface of said metal record, placing a stylus having a paraboloidal tip of a material which is not abraded by said metal record in one end of said groove of said metal record, holding the same therein under the pressure and causing said stylus to track throughout the length of said groove and follow the undulations therein, the pressure between the tip of said stylus and the walls of said groove being sufficient to slightly displace the metal in engagement with said stylus, and forming from the resulting metal record a die or matrix in the face of which is a negative of the finished groove in said resulting metal record.

11. The method of making a sound record tablet, which consists in making by electro-deposition a shell or electroplate having in the face thereof an exact duplicate of the sound record groove in a sound record tablet, backing up said electroplate to form a metal record, placing a stylus having a paraboloidal tip of a material which is not abraded by said metal record in one end of said groove of said metal record, and holding the same therein under pressure and causing said stylus to track throughout the length of said groove and follow the undulations therein, in the same direction as that in which a stylus would traverse said groove during the reproduction of the sound, originally recorded, therefrom, the pressure between the tip of said stylus and the walls of said groove being sufficient to slightly displace the metal in engagement with said stylus.

12. The method of making a sound record tablet, which consists in making by electro-deposition a shell or electroplate having in the face thereof an exact duplicate of the sound record groove in a sound record tablet, backing up said electroplate to form a metal record, lapping the face of the metal record, to reduce the depth of the groove, burnishing the walls of said groove and slightly rounding the edges between the side walls of the groove and the face of said record, placing a stylus having a paraboloidal tip of a material which is not abraded by said metal record in one end of said groove of said metal record, holding the same therein under pressure and causing said stylus to track throughout the length of said groove and follow the undulations therein, in the same direction as that in which a stylus would traverse said groove during the reproduction of the sound, originally recorded, therefrom, the pressure between the tip of said stylus and the walls of said groove being sufficient to slightly displace the metal in engagement with said stylus, and forming from the resulting metal record a die or matrix in the face of which is a negative of the finished groove in said lapped metal record.

13. The method of making a sound record tablet, which consists in making by electro-deposition a shell or electroplate having in the face thereof an exact duplicate of the sound record groove in a sound record tablet, backing up said electroplate to form a metal record, lubricating the surface of said metal record, placing a stylus having a paraboloidal tip of a material which is not abraded by said metal record in one end of said groove of said metal record, and holding the same therein under pressure and causing said stylus to track throughout the length of said groove and follow the undulations therein, in the same direction as that in which a stylus would traverse said groove during the reproduction of the sound, originally recorded, therefrom, the pressure between the tip of said stylus and the walls of said groove being sufficient to slightly displace the metal in engagement with said stylus.

14. The method of making a sound record tablet, which consists in making by electrodeposition a shell or electroplate having in the face thereof an exact duplicate of the sound record groove in a sound record tablet, backing up said electroplate to form a metal record, reducing the depth of said groove and burnishing the walls thereof, lubricating the surface of said metal record, placing a stylus having a paraboloidal tip of a material which is not abraded by said metal record in one end of said groove of said metal record, holding the same therein under pressure and causing said stylus to track throughout the length of said groove and follow the undulations therein, in the same direction as that in which a stylus would traverse said groove during the reproduction of the sound, originally recorded, therefrom, the pressure between the tip of said stylus and the walls of said groove being sufficient to slightly displace the metal in engagement with said stylus, and forming from the resulting metal record a die or matrix in the face of which is a negative of the finished groove in said resulting metal record.

15. The method of forming a secondary sound record tablet having a preferred form of groove therein from a primary sound record tablet having therein a sound record groove, which is not of said preferred form, which consists in making a metallic record tablet having in the face thereof a sound record groove which is an exact duplicate of the sound record groove in said primary sound record tablet, and spinning the metal of the walls of the sound record groove to form a sound record groove of said preferred shape.

16. The method of forming a secondary sound record tablet having a preferred form and size of groove therein from a primary sound record tablet having therein a sound record groove which is not of said preferred form or size, which consists in making a metallic record tablet having in the face thereof a sound record groove which is an exact duplicate of the sound record groove in said primary sound record tablet, and spinning the metal of the walls of the sound record groove to form a sound record groove of said preferred form and size.

17. The method of forming a secondary sound record tablet having a desirable type of groove therein from a primary sound record tablet having therein a sound record groove which is not of said desirable type, which consists in making a metallic record tablet having in the face thereof a sound record groove which is an exact duplicate of the sound record groove in said primary sound record tablet, burnishing the walls of the groove and face of the metallic record so formed, and spinning the metal of the walls of the sound record groove to form a sound record groove of the preferred size and shape.

18. The method of forming a secondary sound record tablet having a preferred type of groove therein from a primary sound record tablet having therein a sound record groove which is not of said preferred type, which consists in making a metallic record tablet having in the face thereof a sound record groove which is an exact duplicate of the sound record groove in said primary sound record tablet, burnishing the walls of the groove and face of the metallic record so formed, and spinning the metal of the walls of the sound record groove to form a sound record groove of said preferred type.

19. The method of forming a secondary sound record tablet having a groove of preferred size and shape therein from a primary sound record tablet having therein a sound record groove which is not of said preferred size and shape, which consists in making a metallic record tablet having in the face thereof a sound record groove which is an exact duplicate of the sound record groove in said primary sound record tablet, polishing the walls of the groove and the face of the metallic record so formed by revolving said tablet in the reverse direction to that in which it would be revolved in reproducing the original sound therefrom, and applying a polishing material to the face of said tablet with a brush while said metal record is being revolved, and spinning the metal of the walls of the sound record groove to form a sound record groove of the preferred size and shape.

20. The method of forming a secondary sound record tablet having a preferred form of groove therein from a primary sound record tablet having therein a sound record groove which is not of said preferred form, which consists in making a metallic record tablet having in the face thereof a sound record groove which is an exact duplicate of the sound record groove in said primary sound record tablet, polishing the walls of the sound record groove and the face of the tablet to produce a rounded corner where the side walls of the sound record groove merge in the face of the metallic sound record, and spinning the metal of the walls of the sound record groove to form a sound record groove of said preferred form.

21. The method of forming a secondary sound record tablet having a groove therein of substantially standard depth and size throughout from a primary sound record tablet, the sound record groove of which is too shallow, which consists in making a metallic sound record tablet in the surface of which is a sound record groove exactly like that in said primary tablet, then polishing the face of said metal record with a brush impregnated with polishing material to burnish the walls of the groove in said metal record and the face thereof, and to round the corners between the side walls of the sound record groove and the face of said tablet, and then causing a stylus of hard unwearing material, and of said standard shape and size, to traverse throughout the length of said sound record groove in said metallic record to change said groove into a groove of substantially standard shape and depth by slightly displacing the metal of the walls thereof.

22. The method of forming a secondary sound record tablet having a groove therein of substantially standard depth and size throughout from a primary sound record tablet, having therein a sound record groove which is too shallow, which consists in making a metallic sound record tablet in the surface of which is a sound record groove exactly like that in said primary tablet, polishing the face of said metal record with a brush impregnated with polishing material to burnish the groove in said metal record and the face thereof to round the sharp corners between the side walls of the sound record groove and the face of said tablet, while said tablet is being rotated in a direction opposite to that in which the tablet should be rotated in reproducing the original sound therefrom, and then causing a stylus of hard unwearing material, and of a standard shape and size, to traverse throughout the length of said sound record groove in said metallic record to change said groove into a groove of said standard shape and depth by displacing the metal of the walls thereof.

23. The method of changing the shape and depth of the sound record groove in a metallic sound record tablet, which consists in causing a paraboloidal stylus to be held in said groove under a constant yielding pressure sufficient to slightly displace the metal of said tablet in engagement therewith and slowly rotating said tablet whereby said stylus is free to traverse the entire length of said sound record groove and faithfully follow the undulations therein and slightly spin the metal of the walls of the groove to conform to the shape of the tip of said stylus.

24. The method of changing the shape and depth of the sound record groove in a metallic sound record tablet, which consists in burnishing the walls of the sound record groove so made and simultaneously rounding the corners where the side walls of the groove merge into the face of the tablet, and then causing a paraboloidal stylus to be held in said groove under a constant yielding pressure sufficient to slightly displace the metal of said tablet in engagement therewith, and slowly rotating said tablet whereby said stylus is free to traverse the entire length of said sound record groove and faithfully follow the undulations therein and slightly spin the metal of the walls of the groove to conform to the shape of the tip of said stylus.

25. The method of changing the shape and depth of the sound record groove in a metallic sound record tablet, which consists in lapping the face of said tablet, and then burnishing the face of said tablet and the walls of the sound record groove by holding a brush impregnated with burnishing material against the face of said tablet while said tablet is being rotated in a direction opposite to that in which said record should be rotated during the reproduction of sound therefrom, then causing a paraboloidal stylus to be held in said groove under a constant yielding pressure sufficient to slightly displace the metal of said tablet in engagement therewith, and slowly rotating said tablet whereby said stylus is free to traverse the entire length of said sound record groove and faithfully follow the undulations therein and slightly spin the metal of the walls of the groove to substantially conform to the shape of the tip of said stylus.

26. The method of making commercial sound record tablets provided with a sound record groove of uniform width when measured at right angles to the direction of said groove at any point therein from a primary sound record tablet having a sound record groove of variable width when measured at right angles to the direction of the groove at any selected point, which consists in making a metallic record from said primary record and provided with a sound record groove in the face thereof an exact duplicate of the sound record groove in said primary tablet, causing a spinning tool to traverse throughout the length of said groove in said metal record to change said groove into one of uniform width when measured at right angles to the direction of the median line at any selected point therein, forming a die or matrix from the metal record and in which the record of sound in the face thereof is a negative of the groove in the face of said metal record, and pressing commercial records from said die.

27. The method of making commercial sound record tablets provided with a sound record groove of uniform width when measured at right angles to the direction of said groove at any point therein from a primary sound record tablet having a sound record groove of variable width when measured at right angles to the direction of the groove at any selected point, which consists in making a metallic record from said primary record and provided with a sound record groove in the face thereof an exact duplicate of the sound record groove in said primary tablet, causing a metal spinning tool to traverse throughout the length of said groove in said metal record to change said groove into one of uniform width when measured at right angles to the direction of the median line at any selected point therein, forming a die or matrix from the metal record and in which the record of sound in the face thereof is a negative of the groove in the face of said metal record, and pressing commercial records from said die.

28. The method of making commercial sound record tablets provided with a sound record groove of uniform width when measured at right angles to the direction of said groove at any point therein from a primary sound record tablet having a sound record groove of variable width when measured at right angles to the direction of the groove at any selected point, which consists in making a metallic record from said primary record and provided with a sound record groove in the face thereof an exact duplicate of the sound record groove in said primary tablet, burnishing the face of said metallic tablet and the walls of the sound record groove therein to round over the edges between the side walls of the sound record groove and the face of the tablet, causing a metal spinning tool to traverse throughout the length of said groove in said metal record to change said groove into one of uniform width when measured at right angles to the direction of the median line at any selected point therein, forming a die or matrix from the metal record and in which the record of sound in the face thereof is a negative of the groove in the face of said metal record, and pressing commercial records from said die.

29. The method of spinning the material of the walls of a sound record groove in a sound record tablet, without injuriously affecting the sound reproducing qualities or properties of said groove, which consists in propelling a spinning stylus, the tip of which is substantially paraboloidal in shape, progressively throughout the entire length of said sound record groove by and in accordance with said groove, and allowing the stylus to freely vibrate in following the undulations in the walls of said groove.

30. The method of spinning the material of the walls of a sound record groove into a shape different from that already formed in said tablet, without injuriously affecting the sound reproducing properties or qualities of said groove, which consists in propelling a spinning stylus, the tip of which is not of the shape of parts or portions of said groove, progressively throughout the length of said record by and in accordance with said groove, while said stylus is held in said groove under a pressure sufficient to slightly displace the material of said tablet in engagement therewith, and allowing said stylus to freely vibrate in following the undulations in the walls of said groove.

31. The method of spinning the material of the walls of a metallic sound record tablet, without injuriously affecting the sound reproducing qualities or properties of said groove, which consists in propelling a spinning stylus progressively across said tablet throughout the entire length of said record groove by and in accordance with said groove, while said stylus is held against said groove under a pressure sufficient to slightly displace the material in engagement therewith, said stylus being free to vibrate in following the undulations in said groove.

32. The method of spinning the material of the walls of a sound record groove in a metallic sound record tablet, without injuriously affecting the sound reproducing qualities or properties of said groove, which consists in propelling a stylus having a tip shaped to produce the desired form of groove progressively throughout the entire length of said sound record groove by and in accordance with said groove while said tip is held in said groove under a pressure sufficient to slightly displace the metal of said tablet when a relative motion is produced between said tablet and said stylus, and allowing said stylus to freely vibrate in following the undulations corresponding to sound waves in said groove.

33. The method of changing the shape of a sound record groove already formed in a metallic sound record tablet, without injuriously affecting the sound reproducing qualities or properties of said groove, which consists in bringing a stylus having a paraboloidal tip of a material which is not substantially abraded by the material of said tablet, progressively throughout the entire length of said sound record groove by and in accordance with said groove while said stylus is held in said groove under a pressure sufficient to slightly displace the metal in engagement therewith, and allowing said stylus to freely vibrate in following the undulations corresponding to sound waves in said groove.

34. The method of changing the shape of the walls of a sound record groove in a metal record, without injuriously affecting the sound reproducing qualities or properties of said groove, which consists in holding a spinning stylus in said groove under a pressure sufficient to displace the material of said tablet, rotating said metal record to propel said stylus across said tablet and progressively throughout the entire length of said groove by and in accordance with said groove, said tablet being rotated in the same direction as that in which it would be rotated in reproducing the sound originally recorded therein from said groove, and allowing said stylus to freely vibrate in following the undulations in said groove.

35. The method of changing the shape of the walls of a sound record groove in a metal record, without injuriously affecting the sound reproducing qualities or properties of said groove, which consists in burnishing or polishing the walls of said groove by rotating said record in the reverse direction to that in which it would be rotated in reproducing from said groove the sound originally recorded therein, and pressing a burnishing or polishing instrument against the face of said tablet and into said groove, then holding a spinning stylus in said groove under a pressure sufficient to displace the material of said tablet, rotating said metal record to propel said stylus across said tablet progressively throughout the entire length of said groove by and in accordance with said groove, said tablet being rotated in the same direction as that in which it would be rotated in reproducing from said groove the sound originally recorded therein, and allowing said stylus to freely vibrate in following the undulations in said groove.

36. The method of changing a sound record groove from one of uniform width when measured parallel to the plane of the oscillation of the stylus by means of which the said groove was originally recorded, to a groove of uniform width when measured at right angles to the direction of the groove at any selected point, which consists in holding the tip of a spinning stylus in said sound record groove under substantially uniform but yielding pressure, and causing said stylus to traverse throughout the entire length of the sound record groove to displace the material of the walls of said groove in those places where the groove is narrow when measured at right angles to the direction of the groove at that point.

37. The method of making a sound record tablet which consists in forming a metallic duplicate from a sound record tablet, placing a spinning stylus in one end of the groove of said metal record, holding the same therein under pressure sufficient to slightly displace the metal in engagement with said stylus and causing said stylus to track throughout the length of said groove following the undulations thereof.

38. The method of forming a secondary sound record tablet from a primary sound record tablet having a groove therein which is of a non-preferred form, which consists in propelling a stylus, the tip of which differs in longitudinal shape from the groove in said primary sound record tablet, progressively throughout the length of said record, while said stylus is held in said groove under a pressure sufficient to slightly displace the material of said tablet in engagement therewith.

39. The method of changing a sound record groove from one of uniform width when measured parallel to the plane of oscillation of the stylus by means of which the same was recorded, to a groove of uniform width when measured at right angles to the direction of the groove at any selected point which consists in causing a stylus held under pressure against the walls of the groove to traverse the length of the sound record groove.

40. The method of forming a secondary sound record tablet having a preferred form and size of groove therein, from a primary sound record tablet having a sound record groove which is of a non-preferred form, consisting in making a metallic record tablet having in the face thereof a record groove which is an exact duplicate of the sound record groove in said primary sound record tablet, and spinning the metal of the walls of the sound record groove to form a sound record groove of said preferred form.

41. The method of making sound records of the laterally undulatory groove type which consists in producing a duplicate of the master record in suitable metal or other material susceptible to spinning or displacement, traversing the sound groove thereof by a spinning stylus, forming a master die or matrix therefrom and pressing or forming the sound records.

42. The method of making sound records of the laterally undulatory groove type which consists in producing a duplicate of the master record in suitable metal or other material susceptible to spinning or displacement, traversing the sound groove thereof by a spinning stylus, of a shape corresponding to a reproducing stylus, forming a master die or matrix therefrom and pressing or forming the sound records.

43. The method of making sound records of the laterally undulatory cut groove type which consists in producing a duplicate of the master record in suitable metal or other material susceptible to spinning or displacement, traversing the sound groove thereof by a spinning stylus, forming a master die or matrix therefrom and pressing or forming the sound records.

44. The method of making sound records of the laterally undulatory cut groove type which consists in producing a duplicate of the master record in suitable metal or other material susceptible to spinning or displacement, traversing the sound groove thereof by a spinning stylus of a shape corresponding to a reproducing stylus, forming a master die or matrix therefrom and pressing or forming the sound records.

45. The method of making sound records of the laterally undulatory cut groove type which consists in producing a duplicate of the master record in suitable metal or other material susceptible to spinning or displacement, traversing the sound groove thereof by a spinning stylus of a shape corresponding to a reproducing stylus whereby the sound groove is at all parts of its length made of substantially uniform width measured at right angles to its median line, forming a master die or matrix therefrom and pressing or forming the sound records.

46. The method of standardizing a sound record of the laterally undulatory groove type which consists in producing a grooved duplicate in suitable metal or other suitable material susceptible to spinning or displacement and traversing the sound groove of same by a spinning stylus.

47. The method of standardizing a sound record of the laterally undulatory groove type which consists in producing a grooved duplicate in suitable metal or other suitable material susceptible to spinning or displacement and traversing the sound groove of same by a spinning stylus of a shape corresponding to a reproducing stylus.

48. In the method of making sound records, cutting a sound groove in wax or other suitable material by a laterally oscillating cutting stylus, producing a duplicate of same in suitable metal or other suitable material susceptible to spinning or displacement and traversing the sound groove thereof by a spinning stylus.

49. In the method of making sound records, cutting a sound groove in wax or other suitable material by a laterally oscillating cutting stylus, producing a duplicate of same in suitable metal or other suitable material susceptible to spinning or displacement and traversing the sound groove thereof by a spinning stylus of a shape corresponding to a reproducing stylus.

50. The method of standardizing a sound record of the laterally undulatory groove type which consists in traversing the sound groove by a spinning stylus guided by the undulations of the groove.

51. The method of standardizing a sound record of the laterally undulatory groove type which consists in traversing the sound groove by a spinning stylus under pressure guided by the undulations of the groove.

52. The method of standardizing a sound record of the laterally undulatory groove type which consists in slowly traversing the sound groove by a spinning stylus guided by the undulations of the groove.

53. The method of standardizing a sound record of the laterally undulatory groove type which consists in traversing the sound groove by a spinning stylus of a shape corresponding to a reproducing stylus guided by the undulations of the groove.

54. The method of making sound records of the laterally undulatory groove type, which consists in producing a duplicate of the master record in a suitable metal or other material susceptible to spinning or displacement, traversing the sound groove thereof by a spinning stylus to spin said groove into a shape corresponding to a reproducing stylus, forming a master die or matrix therefrom, and pressing or forming the sound records.

55. The method of standardizing a sound record of the laterally undulatory groove type, which consists in producing a grooved duplicate in metal or other suitable material susceptible to spinning or displacement, and traversing the sound groove of the same by a spinning stylus to spin said groove into a shape corresponding to a reproducing stylus.

56. In the method of making sound records, cutting a sound groove in wax or other suitable material by a laterally oscillating cutting stylus, producing a duplicate of the same in suitable metal or other suitable material susceptible to spinning or displacement, and traversing the sound groove thereof by a spinning stylus to spin said groove into a shape corresponding to a reproducing stylus.

57. The method of standardizing a sound record of the laterally undulatory groove type, which consists in traversing the sound groove by a spinning stylus guided by the undulations of said groove to spin said groove into a shape corresponding to a reproducing stylus.

In testimony whereof, we have hereunto set our hands this 14th day of December, A. D. 1914.

JAMES W. OWEN,
ALBERTIS HEWITT.

Witnesses:
FRANK B. MIDDLETON, Jr.,
JOHN D. MYERS.